United States Patent
Kovacs

[15] 3,676,797
[45] July 11, 1972

[54] ATOMIC FLUORINE LASER

[72] Inventor: Mark A. Kovacs, Manchester, Conn.

[73] Assignee: United Aircraft Corporation, East Hartford, Conn.

[22] Filed: Dec. 21, 1970

[21] Appl. No.: 100,201

[52] U.S. Cl..............................................331/94.5, 330/4.3
[51] Int. Cl.........................................................H01s 3/22
[58] Field of Search....................................331/94.5; 330/4.3

[56] References Cited

UNITED STATES PATENTS 3,411,105  12/1968  Patel....................................331/94.5

OTHER PUBLICATIONS

Cheo et al., Applied Physics Letters, Vol. 7, No. 7 1 Oct. 65, pp. 202–204.

Hesser et al., J. of Chemical Physics, vol. 47, No. 9, 1 Nov 1967, pp. 3443–3450

Kevan, J. of Chemical Physics, Vol. 44, No. 2, 15 Jan 1966, pp. 683–686

*Primary Examiner*—Ronald L. Wibert
*Assistant Examiner*—R. J. Webster
*Attorney*—Richard N. James

[57] ABSTRACT

Compound gases having fluorine as a constituent are combined with helium in an enclosure within an optical cavity and are subjected to the discharge of electrical energy. The electric discharge dissociates the compound gas providing fluorine atoms and excites the fluorine providing a population inversion of electronic energy levels. The fluorine lases in the optical cavity producing a visible beam of laser energy at 7039, 7129 and 7204 Angstroms.

4 Claims, 2 Drawing Figures

Patented July 11, 1972 3,676,797

INVENTOR
MARK A. KOVACS

ATOMIC FLUORINE LASER

BACKGROUND OF THE INVENTION

1. Field of Invention

This invention relates to gas lasers and more particularly to a laser operating on electronic energy levels of atomic fluorine.

2. Description of the Prior Art

Machines able to provide laser energy have been available for over a decade; the earliest of these machines could produce a limited amount of laser power at essentially one wavelength. The laser art progressed rapidly and during the process, sophisticated laser devices which initially were unforseeable were discovered and developed. At the present time, lasers capable of a variety of output powers, efficiencies, wavelengths, working media, energization methods and other variable characteristics are known.

The basic functioning of all lasers is the same. A beam of laser energy can be produced if appropriate energization means, working medium, and optical means are provided. In a typical laser, electrons in a relatively heavily populated lower energy level of a working medium receive energy from a source which is generally chemical or electrical in nature although it need not necessarily be either. These energized electrons populate an allowed and otherwise sparsely populated upper energy level of the working medium and when the electron population in the upper energy level exceeds the electron population in the lower energy level a condition known as a population inversion exists. A population inversion is an unstable energy configuration and any medium in which such an inversion exists has a natural tendency to reorganize its electrons and eliminate the inversion. During such a reorganization, electrons move from the upper energy level to the lower energy level giving up energy in the process. This energy which takes the form of electromagnetic radiation has a wavelength corresponding to the difference between the two energy levels involved. The coordinated transfer of many electrons from the upper energy level to the lower energy level of the working medium causes emission of electromagnetic radiation which can be controlled by optical means and made orderly into a useful laser beam.

The wavelength of the electromagnetic radiation emitted is described with precision by the relationship $$\lambda = HC/\Delta E$$

where $\lambda$ is the wavelength of the emitted radiation, $H$ is Planck's constant, $C$ is the speed of light, and $\Delta E$ is the difference in energy between the upper and lower energy levels.

Since the allowed energy levels in any given medium are discrete, the wavelength of a given laser cannot be varied arbitrarily although it may be possible to get an emission of more than one wavelength from one lasing medium. Also, the preferred laser for a given application is very often a function of the characteristic wavelength of the laser, and a continuing search for possible lasing activity between energy levels which provide laser energy at new wavelengths is in progress.

SUMMARY OF THE INVENTION

An object of the present invention is the production of visible laser energy at 7039 Angstroms (A), 7129 A and 7204 A from electronic transitions between energy levels in fluorine gas atoms.

According to the present invention, atomic fluorine is induced to produce a set of laser transitions at 7039 A, 7129 A and 7204 A. Gas mixtures comprising a fluorine containing gas and helium gas are subjected to an electrical discharge in an optical cavity, the discharge causing the mixtures to chemically dissociate and produce a population inversion of electronically excited fluorine atoms which is capable of lasing.

The present invention is characterized by the high optical gain which exists in atomic fluorine for the particular transitions we have observed. A further feature is the low current density which exists in the tube during discharge.

An advantage of the present invention is the visibility of the laser lines which are produced. Also these lines are produced by transition between electronic energy levels in fluorine thereby requiring less energy and providing greater conversion efficiency than similar ionic laser systems.

The foregoing and other objects, features and advantages of the present invention will become more apparent in the light of the following detailed description of the preferred embodiment thereof as illustrated in the accompanying drawing.

DESCRIPTION OF THE PREFERRED EMBODIMENT

Figure 1:
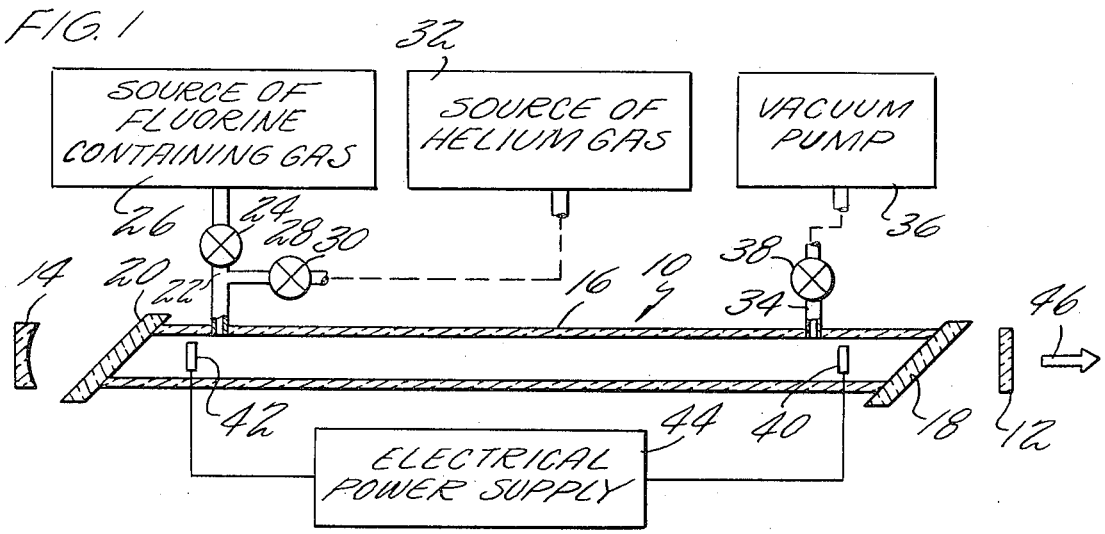
FIG. 1 is a simplified diagram of a laser system which provides laser energy in accordance with the present invention.

The apparatus used to produce the atomic fluorine laser activity in accordance with the present invention is shown in FIG. 1. An optical cavity 10 is formed between a flat mirror 12 and a concave mirror 14. A glass cylinder or discharge tube 16 which is sealed at each end by Brewster angle windows 18 and 20 is positioned within the cavity and contains laser gases. The discharge tube is connected at an inlet 22 through an inlet control valve 24 to a source of a compound gas containing fluorine 26; in a like manner, the discharge tube is connected at a helium inlet 28 through a helium control valve 30 to a source of helium gas 32, and a vacuum exhaust pump 34 is connected to the discharge tube at an exhaust section 36 through a vacuum control valve 38. The discharge tube also supports a pair of electrodes 40 and 42 which are connected to an electric power supply 44.

The mirrors forming the optical cavity 10 are spaced apart by approximately 3 meters. The flat mirror 12 is made of dielectrically coated material and cooling is unnecessary. A laser output beam 46 is taken from the optical cavity through the flat mirror which is 85 percent reflective. The concave mirror 14 which has a radius of curvature of 10 meters and reflectivity of 99 percent is also dielectrically coated.

The discharge tube is approximately 3 meters in length with a 25 millimeter bore.

To operate the apparatus, the vacuum pump 36 is actuated to lower the pressure in the discharge tube; the inlet valve 24 and the helium control valve 30 are closed and the vacuum valve 38 is open during this procedure. Then the valve 38 is closed and gases from the source 26 and the source 32 are admitted to the discharge tube to establish partial pressures of approximately one tenth Torr and 5 Torr respectively in the discharge tube. The fluorine containing gas is preferably selected from the group consisting of sulfur hexafluoride, carbon tetrafluoride and hexafluoroethane although any gas which will decompose under the action of an electric discharge to produce fluorine atoms may be used.

Figure 2:
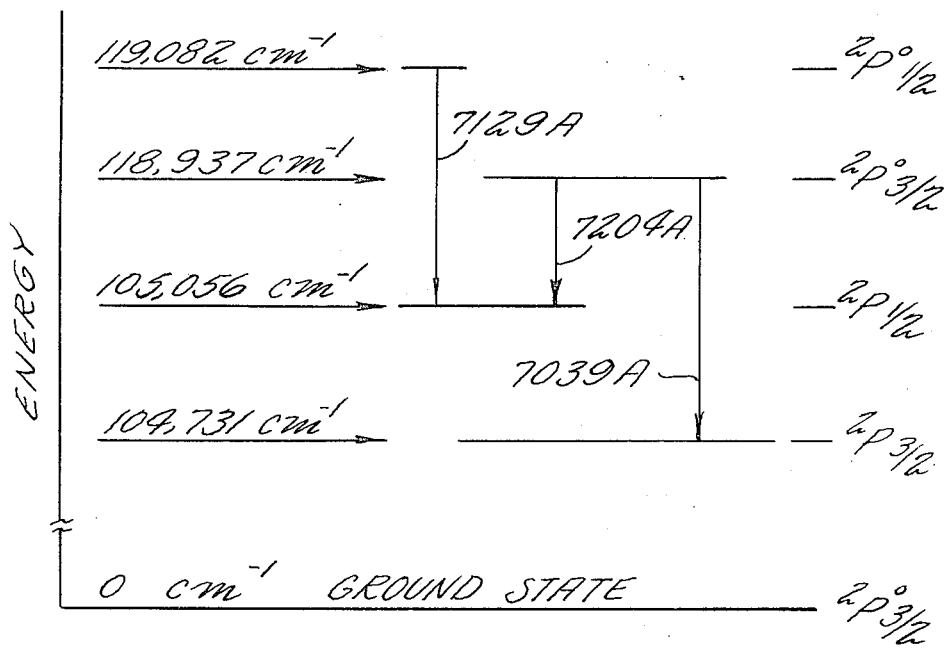
FIG. 2 is an energy level diagram for the observed transitions in fluorine I in accordance with the present invention.

The power supply 44 provides an intermittent electric potential between the electrodes 40 and 42 at a rate of 15 pulses per second; the intermittent electric potential or pulses have a duration of 5 to 10 microseconds and an electric potential range of 0 to 25 kilovolts. When these electric pulses are applied between the electrodes 40 and 42, electrical breakdown of the gases within the discharge tube occurs and electric current flows through the gas between the electrodes. The fluorine containing gas molecules dissociate due to the electric current, providing free fluorine atoms which become electronically excited as is shown diagrammatically in FIG. 2. The indicated characteristics of the electric pulse generating equipment reflect the limitations of the particular equipment which was used, however, the duration of the electric pulses, the magnitude of the electric potential and the pulse repetition rate may vary substantially from what is indicated above and still provide laser in atomic fluorine.

The three wavelengths of laser transitions which occur in accordance with the present invention in fluorine I (unionized fluorine) are shown as well as various electronic energy states of fluorine I. The wavelengths are 7039 A, 7129 A and 7204 A measured under vacuum standard. The ordinate is in wave numbers which is a measure of the number of electromagnetic waves per unit length; for example, light having a wavelength ($\lambda$) of 5,000 A would have a wave number ($\bar{f}$) of 0.0002 per A or 20,000 per centimeter since $\bar{f}$ is the reciprocal of $\lambda$. Wave numbers also are representative of a particular energy, i.e. since $\lambda = HC/\Delta E$ with the terms hereinbefore defined and $\lambda = 1/\bar{f}$, it follows that $$\Delta E = HC\bar{f}.$$

When the electric pulses are applied to the electrodes, electrons from the ground or $^2P^0_{3/2}$ level are excited to the $^2P^0_{1/2}$ and $^2P^0_{3/2}$ levels thereby creating a greater electron population in these levels than exists in the lower energy levels $^2P_{1/2}$ and $^2P_{3/2}$. As the energized electrons take up occupancy in the lower energy levels (shown in FIG. 2) under the influence of the laser action occurring in the optical cavity, energy is released and the three laser lines at 7039 A, 7129 A and 7204 A are observed.

The foregoing is a description of an analytical model of the lasing activity of the atomic fluorine system. As a practical matter, several processes are occurring simultaneously and the net rate at which electrons move from upper energy levels to lower energy levels determines the output of such a lasing system. One phenomenon tending to reduce the laser output is radiative trapping which occurs under one of two conditions, namely, (1) too high a gas pressure in a discharge tube or (2) a discharge tube having too large a diameter. The photons emitted by fluorine atoms at the center of a large diameter laser tube are quickly reabsorbed by adjacent fluorine atoms. A given photon is caused to undergo a number of absorptions and reradiations as it progresses away from the center of the tube. The absorptions populate the laser lower energy level and tend to destroy the population inversion. Therefore, maximum availability of the laser energy produced within a discharge tube occurs with a small diameter tube wherein a minimum of radiation trapping occurs. Theoretically, the tube radius should be just less than one mean free path of the laser photon emitted; as a practical matter, discharge tubes with a diameter up to 25 millimeters perform well. On the other hand, photons emitted by fluorine atoms near the walls of the tube can escape with little or no reabsorption. Also, fluorine atoms which have electrons in the lower energy level and which are near the tube walls are able to collide with the walls whereby they can give up energy and depopulate their lower energy level. Both reducing the reabsorption and increasing the transfer of energy from the lower energy level to the tube walls contributes to maintaining a population inversion of the lasing energy levels.

Radiation trapping is more sensitive to the partial pressure of the gas having the fluorine component than the diameter of the laser tube. The pressure must be maintained between 0.03 and 0.1 Torr; when the pressure goes much below the indicated range, no laser output occurs and as the pressure approaches the upper limit of the range, the center of the output beam begins to darken and an annular laser beam forms. As the pressure is further increased the darkened center region becomes larger and the annular region in which the laser action occurs becomes smaller. This change in the lasing activity of the active medium continues until the gas pressure becomes so high that the laser activity is completely quenched; the phenomenon is characteristic of the radiation trapping discussed previously.

The exact role of the helium gas in the discharge tube is not known for certain, however, the following may describe the function of the helium. In a molecular laser system, helium is often used because of its well known cooling characteristic; helium can preferentially cool the rotational temperature of an excited molecule while leaving the vibrational temperature relatively unaffected. However, in the atomic fluorine system the helium apparently performs a different function since atomic fluorine has no rotational structure to consider. The present system will not lase without the addition of some helium and a more important role than cooling is suggested for this gas. The helium is considered to be a mechanism for transferring energy to the fluorine containing gas molecules, thereby allowing a splitting off of an excited fluorine atom from the parent molecule. For example, the following reaction apparently occurs:

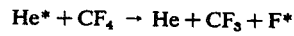

$$He^* + CF_4 \rightarrow He + CF_3 + F^*$$

$^*$ = excited.

The first metastable state in helium is at 19 electron volts and the reaction whereby hexafluoroethane is broken down producing a fluorine atom requires approximately 5 electron volts, leaving approximately 14 electron volts which is exactly the excitation energy of the upper laser level of fluorine. Similarly, decomposing fluorine from some of the other suggested fluorine bearing molecules also requires energy in the three to 5 electron volts range. No theoretical explanation is offered at this time but the partial pressure of helium must be maintained within the range of 2 to 10 Torr.

This system can be run either with the discharge tube completely sealed or with a gas flow through the discharge tube. In the sealed tube mode of operation, the output power of the system decreases to a negligible output within about one half hour. The degradation in performance is due to (1) the various contaminants which build up within the discharge tube due to those residual gases left after the initial evacuation, (2) the outgassing of those contaminants on the interior of the discharge tube which occurs when the system temperature becomes elevated during operation, and (3) the free fluorine which attacks the glass discharge tube thereby depleting the fluorine population and introducing additional contaminants. Those skilled in the art will recognize that these problems may be overcome by utilization of well known high vacuum techniques and the proper choice of materials in the construction of the laser.

Conceivably the type lasing system shown in FIG. 1 could be made to operate CW if the discharge tube were of small enough bore. Continuous excitement of the upper lasing levels of fluorine and the removal of energy from the lower lasing levels to effect a continuous laser output is possible by the avoidance of radiation trapping and by providing a sufficient amount of cooling heat transfer at the walls of the discharge tube. Also, it should be apparent to those skilled that the present invention could be operated with laser systems considered more sophisticated than the one shown in the drawing. For example, high velocity flowing systems sometimes referred to as convective lasers and improvements such as gas preionization or magnetic stabilization of the electric discharge lend themselves to high power output atomic fluorine lasers.

Although the invention has been described with respect to preferred embodiments thereof, it should be understood to those skilled in the art that the foregoing and other changes and omissions in the form and detail thereof can be made therein without departing from the spirit and the scope of the invention, which is to be limited and defined only as set forth in the following claims.

Having thus described typical embodiments of my invention, that which I claim as new and desire to secure by Letters Patent of the United States is:

1. The method of producing visible laser energy in a resonant optical cavity which contains a gas mixture of helium gas and a molecular gas selected from the group consisting of sulfur hexafluoride, carbon tetrafluoride and hexafluoroethane comprising:

establishing the molecular gas partial pressure between 0.01 and 0.1 Torr;

establishing the helium partial pressure between 2 and 10 Torr;

establishing a pulsed electric discharge across the gas mixture to dissociate the molecular gas and to provide fluorine atoms with a sufficient number of electrons excited into the upper electronic energy levels of the atomic fluorine to establish a population inversion in the electronic energy levels of the atomic fluorine; and adjusting the mirrors of the optical resonant cavity to produce stimulated emission and an output beam which is pulsed laser energy having a wavelength between about 7039 and 7204 Angstroms.

2. The method according to claim 1 wherein the wavelength is 7039 Angstroms.

3. The method according to claim 1 wherein the wavelength is 7129 Angstroms.

4. The method according to claim 1 wherein the wavelength is 7204 Angstroms.

* * * * *